United States Patent [19]

Bookout et al.

[11] 4,400,998
[45] Aug. 30, 1983

[54] FOUR SPEED OVERDRIVE TRANSAXLE

[75] Inventors: Charles C. Bookout, Orchard Lake; John P. Heeney, Bloomfield Hills; Richard E. Murphy, Inkster, all of Mich.

[73] Assignee: Ford Motor Company, Dearborn, Mich.

[21] Appl. No.: 149,060

[22] Filed: May 12, 1980

[51] Int. Cl.³ .............. F16H 37/08; F16H 47/08; F16H 57/10
[52] U.S. Cl. .................. 74/740; 74/695; 74/763
[58] Field of Search ........... 74/740, 753, 762, 763, 74/695

[56] References Cited

U.S. PATENT DOCUMENTS

| 2,450,073 | 9/1948 | Avila | 74/695 |
|---|---|---|---|
| 3,300,001 | 1/1967 | Stockton | 192/4 |
| 3,314,307 | 4/1967 | Egbert | 74/688 |
| 3,446,094 | 5/1969 | Ohno et al. | 74/695 X |
| 3,455,185 | 7/1969 | Ohno et al. | 74/695 X |
| 3,491,622 | 1/1970 | Moan | 74/762 X |
| 3,614,902 | 10/1971 | Candellero | 74/763 X |
| 3,859,872 | 1/1975 | Clauss | 74/763 |
| 3,977,272 | 8/1976 | Neumann | 74/695 X |
| 4,106,364 | 8/1978 | Zenker et al. | 74/740 |

Primary Examiner—Rodney H. Bonck
Attorney, Agent, or Firm—Donald J. Harrington; Keith L. Zerschling

[57] ABSTRACT

A transaxle assembly for delivering torque from an engine driven vehicle to the vehicle traction wheels comprising a hydrokinetic torque converter and compound planetary gearing arranged on a first axis which is coincident with the axis of the crankshaft of the engine, a cross drive arranged on an axis that is transverse and axially offset with respect to the axis of the gearing, a differential gear mechanism having output elements on the cross axis arranged close to the transverse plane of the torque converter and final drive gearing between the output element of the multiple ratio gearing and the differential mechanism, the final drive gearing being situated in a plane intermediate the torque converter and the multiple ratio gearing, and clutches and brakes for controlling the speed ratio of the multiple ratio gearing arranged in radially stacked fashion to provide a minimum axial length for the assembly.

4 Claims, 3 Drawing Figures

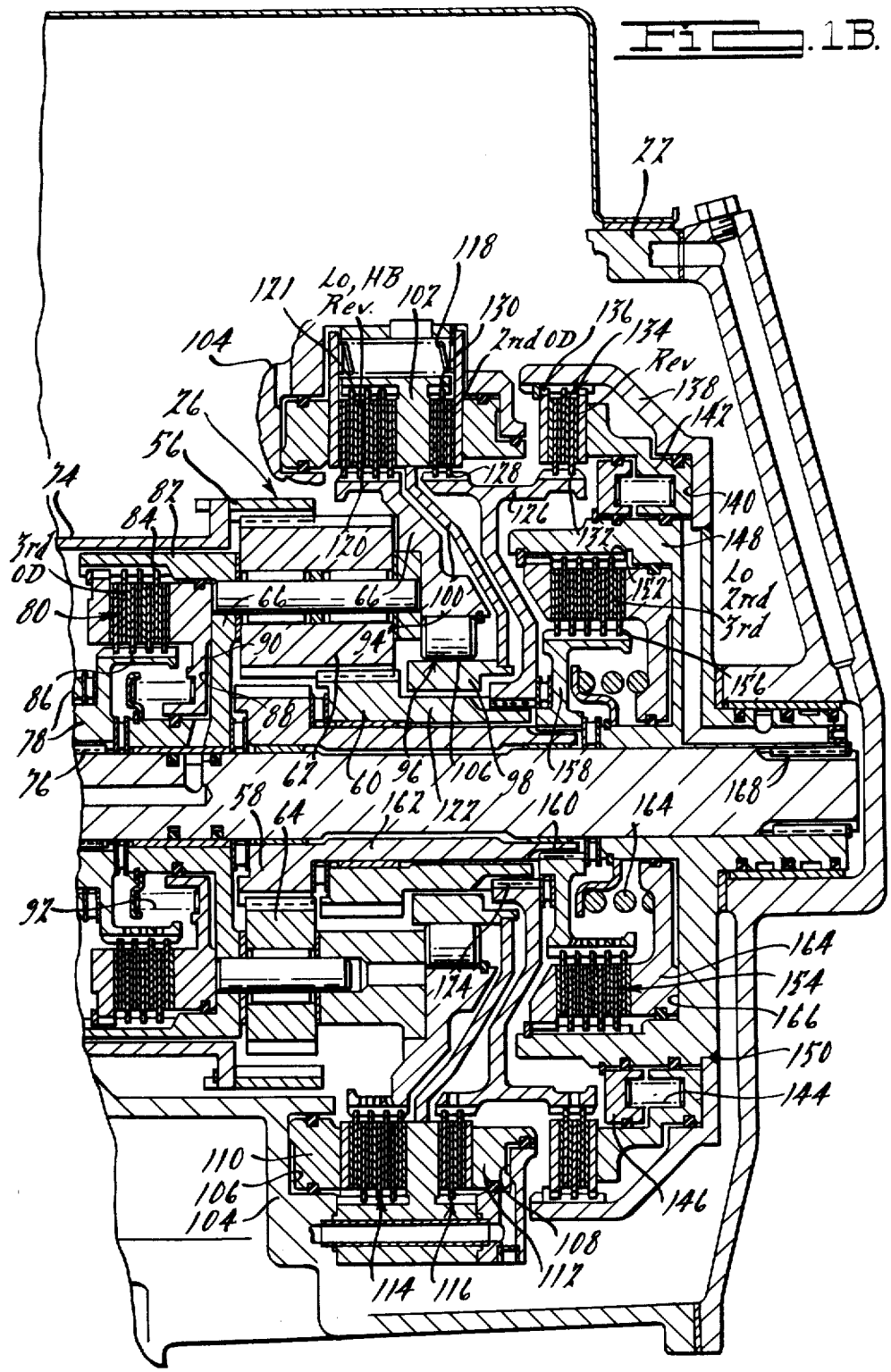

FOUR SPEED OVERDRIVE TRANSAXLE

GENERAL DESCRIPTION OF THE INVENTION

Our invention comprises improvements in transmission mechanisms of the type shown in U.S. Pat. Nos. 3,300,001; 3,314,307; and 3,455,185.

The references identified here show that it is known to provide a gear system with four speed ratios wherein the highest speed ratio is an overdrive and an intermediate speed ratio is a direct drive. The present disclosure describes a structure that also has four speed ratio gearing of the type disclosed in the prior art, but the gearing and the associated control elements are arranged to provide a minimum axial length for the assembly and to provide a final drive gear assembly at a location intermediate a hydrokinetic torque converter unit and the multiple ratio gearing.

The clutches and brakes for controlling the ratio shifts in the multiple ratio gearing are arranged strategically principally on one side of the multiple ratio gearing remote from the converter and disposed in radially stacked fashion to provide a minimum overall axial length. By locating the final drive gearing in this way it is possible to use a final drive gear and differential-axle assembly that is located on an axis spaced from and perpendicular to the common axis of the engine, the hydrokinetic unit and the multiple ratio gearing. It is possible also to use constant-velocity universal joints at each output side of the differential gearing and to locate the universal joints so that a minimum shaft angle is required for the two half shafts that connect drivably the differential mechanism to each of the traction wheels. An arrangement of this type is adapted particularly for use in a front wheel drive vehicle in which the engine is mounted fore-and-aft with respect to the center plane of the vehicle and in which the half shafts extend to each of the two front traction wheels. The effective axle ratio for the driveline is determined by input and output spiral bevel gears in the differential assembly and by the final drive gearing.

BRIEF DESCRIPTION OF THE FIGURES OF THE DRAWINGS

FIGS. 1A and 1B together show a longitudinal cross-sectional view of a preferred embodiment of our invention.

PARTICULAR DESCRIPTION OF THE INVENTION

Figure 1A:
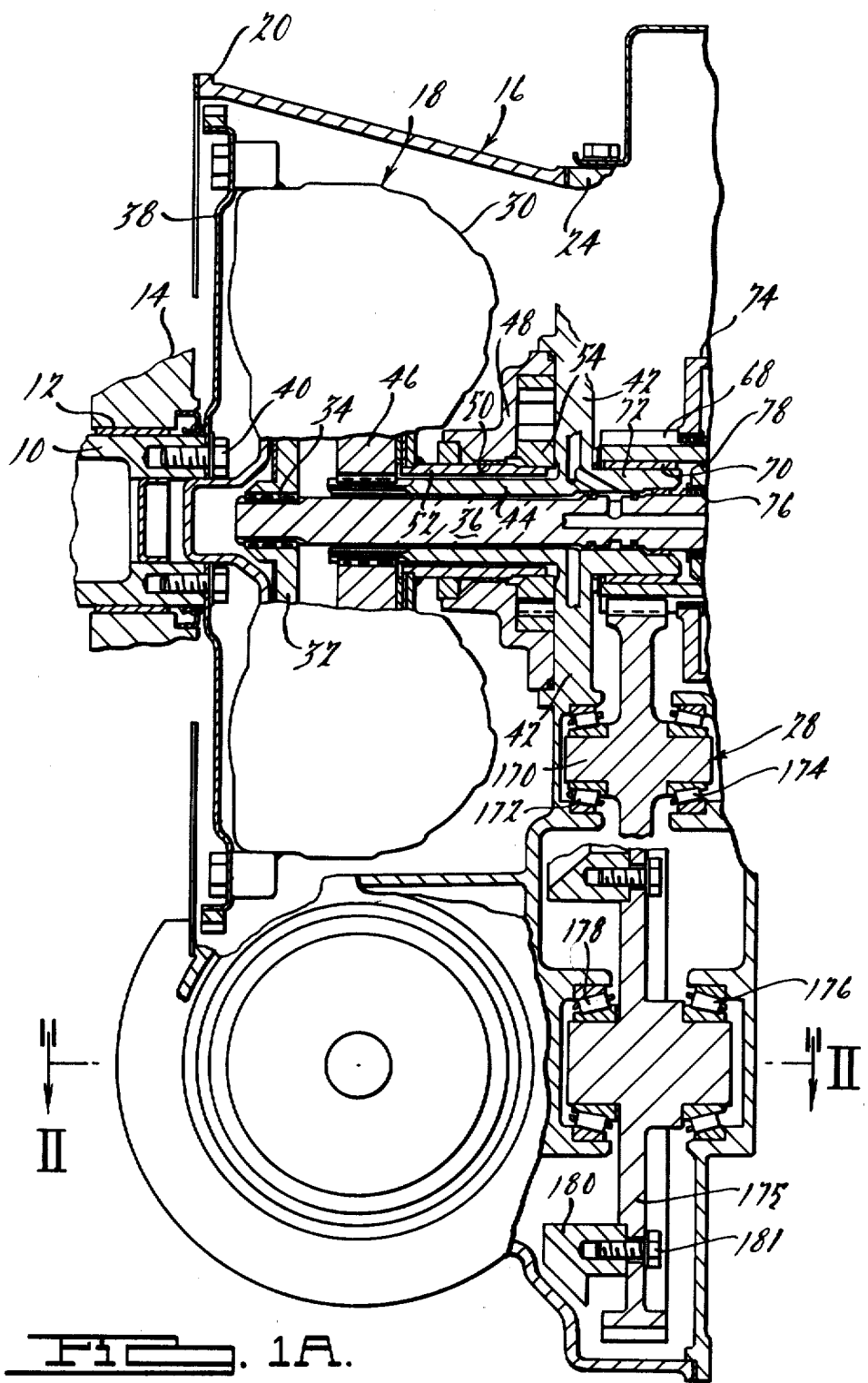

In FIG. 1A reference numeral 10 designates one end of an engine crankshaft for an internal combustion engine and end bearing 12 for the crankshaft is located in a crankshaft opening in the engine housing 14.

Reference may be made to U.S. Pat. Nos. 3,300,001; 3,314,307 and 3,455,185 as well as the related copending application of Bookout et al., Ser. No. 149,063, filed May 12, 1980 now U.S. Pat. No. 4,331,044, entitled "Four Speed Offset Automatic Overdrive Transmission With Lockup in Direct and Overdrive", for disclosures of other types of transaxle assemblies that are adapted, as is the transaxle of this invention, for use with transversely mounted axle half-shafts in front-wheel-drive vehicle or adapted for use with an overdrive planetary gear unit. The related application of Bookout et al. and this application are assigned to Ford Motor Company.

A transmission housing portion 16 surrounds a hydrokinetic torque converter generally indicated by reference numeral 18. The housing portion 16 is adapted to be bolted at its periphery 20 to the engine block of the internal combustion engine, not shown. A second housing portion 22 is bolted at its left hand margin 24, as seen in FIG. 1, to the right hand margin of the housing portion 16. It encloses the multiple ratio gearing 26 and the final drive mechanism generally shown at 28.

The converter 18 comprises an impeller having radial outflow blades connected to impeller shell 30 and a turbine having radial inflow blades which cooperate with the impeller blades to define a torus circuit. The turbine has a hub 32 splined at 34 to turbine shaft 36. The impeller shell 30 is bolted to drive plate 38, which in turn is bolted at 40 to the end of crankshaft 10.

A transverse support wall 42, which is a part of the housing portion 16 has extending therefrom a stationary sleeve shaft 44 which provides a support for stator hub 46. A bladed stator is supported by but 46 between the flow exit section of the turbine and the flow entrance section of the impeller.

A positive displacement pump housing 48 secured to wall 42 provides a bearing support at 50 for impeller hub 52. The hub 52 also forms a pump drive sleeve shaft for positive displacement pump 54, which supplies pressure for the control circuit that controls the application and release of the servos for the brakes and the clutches.

Compound gearing 26 includes a ring gear 56, a small diameter sun gear 58, a large diameter sun gear 60, long planet pinions 62, short planet pinions 64 and a carrier 66 which rotatably supports the short pinions 64 and the long pinions 62. Pinions 62 engage the large diameter sun gear 60 and ring gear 56. Small sun gear 58 engages pinions 64. The pinions 64 engage also pinions 62.

A final drive gear 68 is journalled by bushing 70 on stationary sleeve 72 which forms a part of the wall 72. Final drive gear 68 is connected drivably to ring gear 56 through torque transfer shell 74.

Sun gear shaft 36 is provided with splines 76 which form a driving connection with clutch element 78 for overdrive and third ratio clutch 80. Clutch element 82 for the clutch 80 carries externally splined clutch discs 84 which register with internally splined clutch discs 86 carried by the clutch element 78. Clutch element 82 forms a part of the carrier 66 and defines an annular cylinder 88 in which is positioned an annular piston 90. When the working pressure chamber of said cylinder 88 is pressurized, the piston 90 frictionally engages the clutch discs 84 and 86. Clutch spring 92 tends to disengage the clutch 80.

Carrier 66 also forms the outer race 94 of an overrunning coupling 96. Inner race 98 for the coupling 96 is connected to brake element 100, which is connected to and fixed by brake element 102 and held against rotation by an internal wall 104 for the housing portion 22. Overrunning clutch rollers 106 are disposed between the races 94 and 98, the former being cammed to provide cam surfaces that register with rollers 106 to prevent rotation of the carrier 66 in one direction and to permit freewheeling motion in the opposite direction.

The wall 104 of the housing portion 22 defines two annular cylinders 107 and 108 within which are positioned annular pistons 110 and 112, respectively. Cylinder 106 and piston 110 form a low-speed-and-reverse brake 114, and piston 112 and cylinder 108 form a second ratio-and-overdrive brake 116. Brake element 102 is provided with openings extending in an axial direction to accommodate compression springs 118 which tend to urge normally the pistons 110 and 112 to a brake release position.

Carrier 66 carries at its periphery internally splined brake discs 120. These register with externally splined brake discs 122 carried by the stationary brake element 102.

Sun gear 60 has a sleeve shaft 121 connected to it. The shaft is splined at 124 to brake element 126. Internally splined brake discs 128 are carried by the brake element 126, and they register with externally splined brake discs 130 carried by the brake element 102. Brake 116 is applied whenever the cylinder 108 is pressurized and brake 114 is applied whenever cylinder 107 is pressurized. Brake element 126 also carries internally splined clutch discs 132 for reverse clutch 134. Externally splined brake discs 136 are carried by clutch member 138. Member 138 has an annular cylinder 140 in which is positioned an annular piston 142. The piston 142 engages the clutch 134 whenever the cylinder 140 is pressurized. Clutch spring 144 tends normally to release the piston 142 to disengage the clutch 134. Spring backup member 146 is carried by annular clutch element 148, which is welded at 150 to clutch cylinder 138. Clutch element 148 has splined thereto externally splined clutch discs 152 which form a part of low, second and third speed ratio clutch 154. Companion clutch discs 156 register with clutch disc 152 and are carried by clutch element 158, which in turn is splined at 160 to sun gear sleeve shaft 162 connected to the small sun gear 58. The sleeve shaft 162 for the small sun gear is concentrically disposed within the sleeve shaft 122 for the large sun gear. Clutch return spring 164 is anchored on the clutch element 148 and it applies a clutch disengaging force to clutch piston 164. An annular cylinder 166 formed in the clutch element 148 receives the piston 164. Clutch 154 is engaged whenever the cylinder 166 is pressurized. Thus two annular cylinders 166 and 140 are formed in the same element in radially spaced relationship.

Sun gear shaft 36 is splined at 168 to the clutch element 148 so turbine torque can be distributed to either the first, second and third speed ratio clutch 154 or to the reverse clutch 134.

Figure 2:
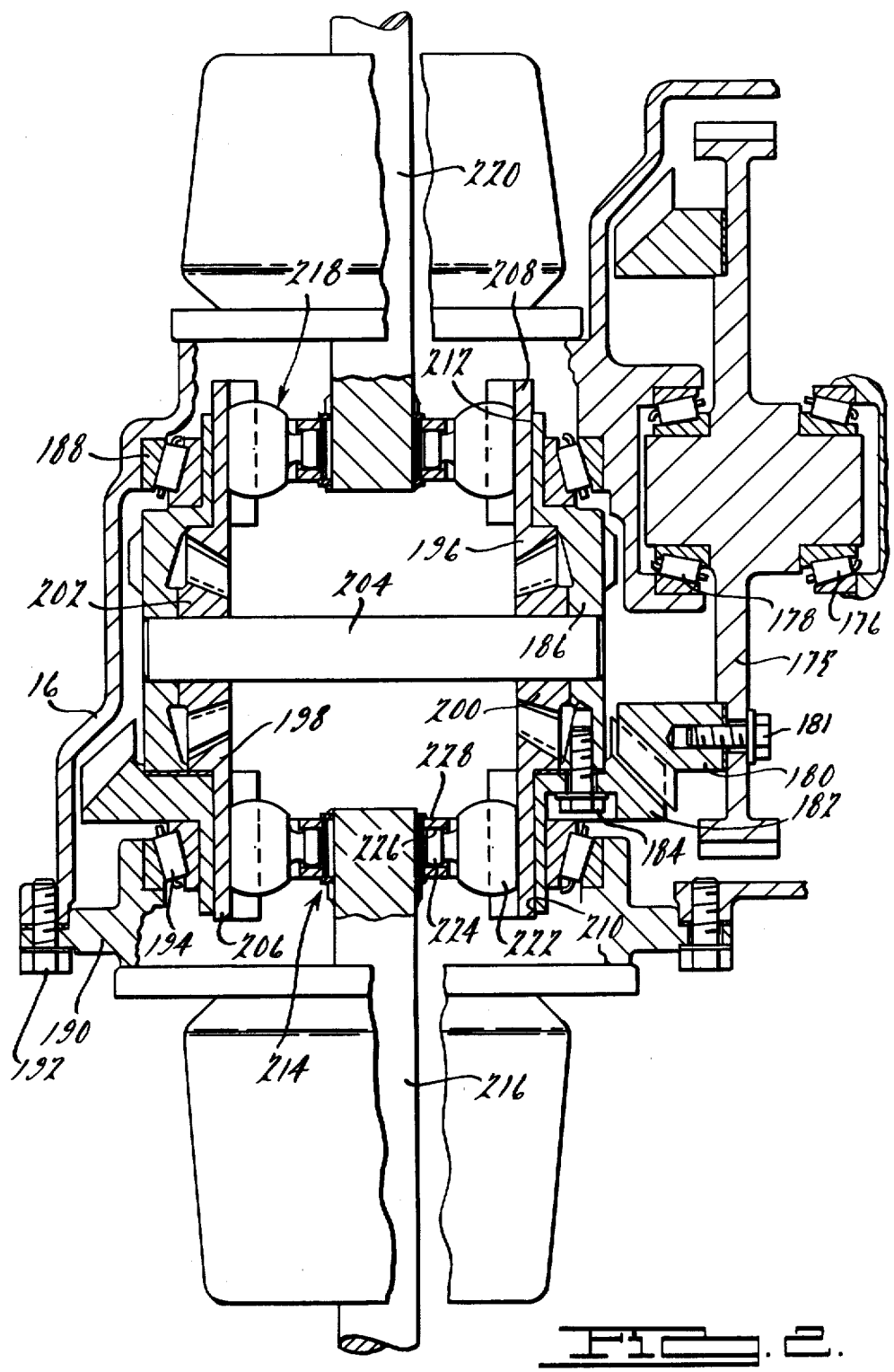
FIG. 2 is a cross-sectional view taken long the plane of section line 2—2 of FIG. 1A.

Ring gear 56 serves as a torque output element of the gear system. Output gear 68 meshes with idler gear 170 which is rotatably supported by spaced tapered roller bearings 172 and 174, which are received in bearing pockets formed in the wall 42 and in bearing wall that forms a part of the housing portion 22. The idler 170 engages final drive gear 175. The gear 175 is journalled at its hub by spaced tapered needle bearings 178 and 176 received, respectively, in bearing pockets formed in the housing portion 16 and in the housing portion 22. Gear 175 carries spiral bevel gear 180 as seen in FIG. 1A and in FIG. 2, and it is secured to the gear 175 by bolts 181 or by some other suitable fastening means. The teeth of the spiral bevel gear 180 engage spiral bevel teeth on ring gear 182, which is bolted by bolts 184 to differential carrier 186. The lower part of the housing portion 16 receives the differential carrier 186 and is provided with a bearing opening for receiving a tapered roller bearing 188 and a bearing support plate 190, the latter being secured by bolts 192 to one side of the housing portion 16. Support plate 190 is provided with bearing pockets for receiving a tapered roller bearing 194 which, together with the bearing 188, rotatably journals the carrier 186.

Differential side gears of the spiral bevel type are shown at 196 and 198. These engage differential pinions 200 and 202, respectively. The pinions 200 and 202 are supported rotatably on pinion shaft 204 received in shaft openings formed in the carrier 186.

Side gears 198 and 196 are formed with hubs 206 and 208 received in openings 210 and 212 in the ring gear 182 and in housing 186, respectively. A first constant velocity universal joint 214 connects the side gear 198 with a first axle shaft 216 and a companion constant velocity universal joint 218 connects side gear 196 with another axle shaft 220, a separate axle shaft being connected drivably to each of the two traction wheels for the vehicle.

Universal joint 214, which is similar to universal joint 218, comprises socket members 222 slidably disposed in longitudinal grooves in the side gear 198. A drive projection 224 extends radially inwardly and is received in cylindrical opening 226 formed in universal joint member 228 fixed to the shaft 216. A projection 224 is formed with a crowned surface that forms a part of the sphere that engages the cylindrical wall of the opening 226, thus accommodating a universal motion of the shaft 216 with respect to the carrier housing.

By choosing appropriately the pitch diameters of the drive gear 68 and the ring gear 176 and by choosing appropriately the pitch diameters of the spiral bevel gears, the overall axle ratio for the driveline can be effected as desired.

If it is desired to use a transmission of this kind in a vehicle installation in which the engine is mounted transversely with respect to the center plane of the vehicle, the differential and axle drive assembly can be arranged as shown in the previously mentioned copending application of Bookout et al whereby the axle shafts would extend in a direction generally parallel to and transversely displaced from the axis of the multiple ratio gearing. The position of the final drive gearing is sufficiently close to the hydrokinetic unit to provide enough space to permit the axle half shaft to extend in a right hand direction in the plane of FIG. 1B without the necessity for having a large angular displacement of the half shaft.

To condition the mechanism for low speed ratio operation the clutch 154 is applied, thereby establishing a driving connection with clutch member 148 and small sun gear 58. With the carrier 66 acting as a reaction element, the gearing is driven in the low speed ratio as the ring gear 56 acts as an output member. Torque is delivered from the ring gear to the final drive gearing. At this time overrunning brake or coupling 96 delivers a reaction torque from the carrier to the housing portion 22. If hill braking in the low speed ratio is desired, brake 114 can be applied.

A ratio change to the second speed ratio is accomplished merely by engaging brake 116. This anchors the large sun gear 60 and the overrunning coupling 96 freewheels. The clutch 154 remains applied.

Direct drive is accomplished by engaging simultaneously clutch 154 and clutch 80, which locks up the gearing for 1:1 ratio operation. Turbine torque is delivered through the converter and through the clutch 154 to the sun gear 58 and the balance of the engine torque is delivered through the clutch 80 directly to the carrier. Overdrive is achieved by engaging clutch 80 and applying brake 116. With the sun gear 60 acting as a reaction member, the ring gear 56 is overspeeded relative to the engine crankshaft.

The strategic disposition of the clutches 134 and 154, one with respect to the other, minimizes the axial length of the transmission. Note that the clutch 134 is radially disposed with respect to the clutch 154. Also the brakes 116 and 114 are located on the side of the clutch 134 closest to the engine and are radially disposed relative to the planetary gear elements. This arrangement also contributes to the minimum overall length of the transmission. This clutch and brake arrangement is made possible in part because of the concentric sleeve shaft arrangement for the sun gears 60 and 58 and by using a clutch 80 at a location intermediate the hydrokinetic unit and the planetary gearing. This makes it possible to locate the final drive gearing as close to the hydrokinetic unit as possible.

Reverse drive is achieved by engaging the clutch 134 and by applying the brake 114. Sun gear 60 under these circumstances acts as a power input element for the gearing; and since the carrier is anchored by the brake 114, the ring gear 56 is driven in the reverse direction.

Having described a preferred embodiment of our invention, what we claim and desire to secure by U.S. Letters Patent is:

1. A transaxle driveline comprising a hydrokinetic torque converter and multiple ratio planetary gearing;

said converter having a turbine and an impeller adapted to be connected drivably to a vehicle engine crankshaft, the axes of the crankshaft, the converter and the gearing being common;

said gearing comprising a ring gear, a large sun gear, a small sun gear, the large sun gear being located on the side of said small sun gear remote from said engine crankshaft, a set of long planet pinions engaging said large sun gear and said ring gear, a set of short planet pinions engaging said small sun gear and the long planet pinions, a carrier for journalling said long and short pinions;

first brake means for anchoring said carrier during operation in first forward drive ratio and in reverse drive, second brake means for anchoring said large sun gear during second underdrive ratio and during overdrive operation;

a turbine shaft connected to said turbine and extending through said planetary gearing to the side of said planetary gearing remote from said crankshaft;

first clutch means for connecting said turbine shaft to the small sun gear during operation in the first and second underdrive ratios and during direct drive operation, second clutch means for connecting said turbine shaft to said carrier during direct drive operation and overdrive operation, third clutch means for connecting said large sun gear to said turbine shaft during reverse drive operation;

said first clutch means and said third clutch means having a common cylinder member with annular cylinders located in radial disposition, one with respect to the other, the third clutch means having a larger operating radius then the first clutch means;

said first and third clutch means being located on the side of said planetary gearing remote from said crankshaft;

said first and second brake means being located radially outward of said planetary gearing and on the side of said first and third clutch means closest to said crankshaft;

and final drive gearing including a differential gear mechanism with an operating output axis spaced from the axis of said final drive gearing, the operating plane of said final drive gearing being located between said converter and said planetary gearing;

said second clutch means being located between said carrier and said final drive gearing and comprising an annular cylinder forming part of said carrier and journalled about said turbine shaft, an annular piston in said cylinder, a clutch element secured to said turbine shaft, first and second clutch discs secured to said annular cylinder and to said clutch element, respectively, said annular piston and said annular cylinder defining a working pressure chamber which, when pressurized, causes said discs to frictionally engage;

a bearing support wall between said impeller and said final drive gearing for journalling the latter, said ring gear encircling said clutch discs and being connected to a torque input gear of said final drive gearing.

2. The combination as set forth in claim 1 wherein said final drive gearing comprises a first power output gear mounted for rotation about said common axis between said converter and said second clutch means.

3. The combination as set forth in claim 1 wherein said differential gear mechanism comprises a spiral bevel gear journalled for rotation parallel to and laterally spaced from said common axis, and a spiral differential carrier gear mounted for rotation about an axis that is generally perpendicular and laterally spaced from said common axis.

4. The combination as set forth in claim 2 wherein said differential gear mechanism comprises a spiral bevel gear journalled for rotation parallel to and laterally spaced from said common axis, and a spiral differential carrier gear mounted for rotation about an axis that is generally perpendicular and laterally spaced from said common axis.

* * * * *